(No Model.)

W. J. JOHNSON.
Handled Strainer.

No. 239,100. Patented March 22, 1881.

Witnesses
A. H. Keeger
J. O. Bishop.

Inventor.
William J. Johnson

N. PETERS, PHOTO-LITHOGRAPHER, WASHINGTON, D. C.

United States Patent Office.

WILLIAM J. JOHNSON, OF NEWTON, MASSACHUSETTS.

HANDLED STRAINER.

SPECIFICATION forming part of Letters Patent No. 239,100, dated March 22, 1881.

Application filed October 9, 1880. (No model.)

*To all whom it may concern:*

Be it known that I, WILLIAM J. JOHNSON, of Newton, Massachusetts, have invented a new and useful Improvement in Handled Strainers; and I hereby declare that the following specification is a full, clear, and exact description of the same, and the accompanying drawings illustrations thereof.

The object of this improvement is to furnish a neat and convenient strainer for tea, coffee, and other liquids, and to provide midway of its stem or handle a suspending-hook adapted to engage with the rim of the slop-bowl, that the drippings may be caught therein while the handle remains uppermost for cleanliness and convenience, and the strainer itself is held above the bottom of the bowl. It is to this hook that my invention relates.

Figure 1:
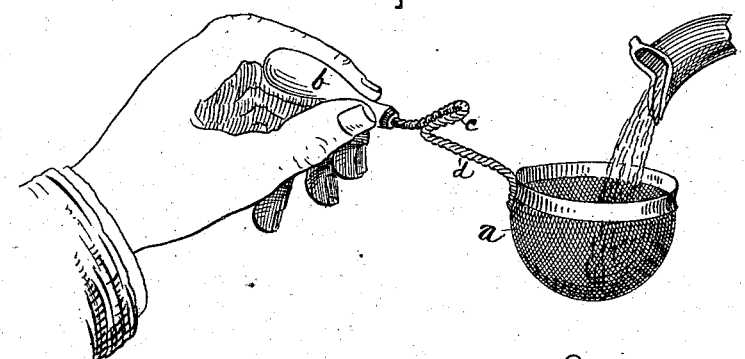
Figure 2:
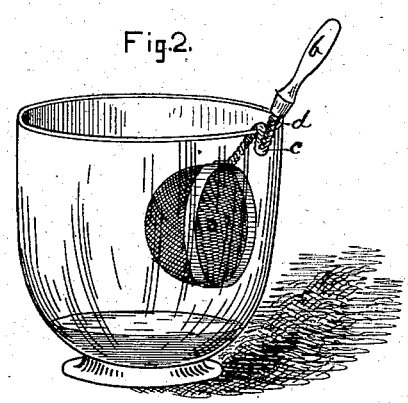
Figure 3:
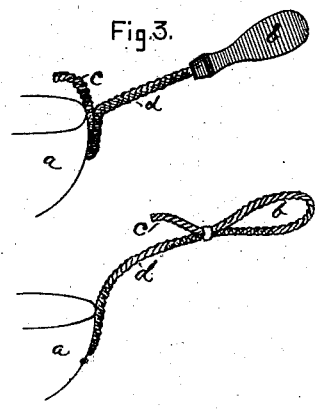

In the accompanying drawings, Figure 1 represents the device in use. Fig. 2 shows it, after use, suspended by its hook; and Fig. 3 illustrates various forms of handles and hooks.

The common form of strainer for this purpose consists of a gauze basket suspended by wires from the spout of a tea or coffee pot; but these are objectionable, since the spring-wire arms clog the spout which they enter, and also because of the dripping upon the table-spread from the grounds caught in the strainer.

With my improvement the strainer $a$ is held, by its handle $b$, over the cup to be filled, and when the beverage has been poured through it into the cup the strainer is placed within the slop-bowl, and suspended above the bottom thereof by the hook $c$, as shown. Thus the drippings are caught in the bowl, while the strainer is supported above the slops therein, and the spout is unobstructed. Previous to use the article may be suspended, by its hook, outside of the spoon-holder.

The hook $c$ is preferably and most conveniently formed integral with the wire stem $d$, which is united, by solder or otherwise, to the binding of the gauze strainer. The handle, preferably of wood, projects above the hook, that it may be more conveniently grasped while the utensil is hung up. The lateral position of the stem and handle with relation to the gauze strainer enables one to hold the article much more comfortably than if the handle was vertically above the strainer, where steam from the beverage was rising. The strainer is held steadily to receive the stream, by reason of the rigid character of the stem and handle.

The mechanical construction of the article is too well known to require explanation.

I am aware that perforated leachers or boilers, inclosing ground coffee or other substance to be cooked, have heretofore been used, suspended by a hook midway of the vertical handle within a vessel, so as to be submerged in boiling water in such vessel. I make no claim to such submerged boiling apparatus to inclose the substance to be cooked, my invention being limited to a concave gauze strainer for beverages, such strainer having a hook between the bowl and the handle to suspend it by when not in use.

I claim as of my invention—

As a new article of manufacture, an open wire-gauze strainer having a rigid stem and handle projecting laterally therefrom, and a suspension-hook located between the strainer and handle, and adapted to support the utensil when not in use and keep the handle uppermost, substantially as set forth.

WILLIAM J. JOHNSON.

Witnesses:
A. H. SPENCER,
J. O. BISHOP.